United States Patent
Ulrey et al.

(10) Patent No.: US 9,080,523 B1
(45) Date of Patent: Jul. 14, 2015

(54) METHOD TO IMPROVE BLOWTHROUGH VIA SPLIT EXHAUST

(71) Applicant: Ford Global Technologies, LLC, Dearborn, MI (US)

(72) Inventors: Joseph Norman Ulrey, Dearborn, MI (US); Brad Alan Boyer, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 28 days.

(21) Appl. No.: 14/157,167

(22) Filed: Jan. 16, 2014

(51) Int. Cl.
| | |
|---|---|
| F02B 33/44 | (2006.01) |
| F02D 23/00 | (2006.01) |
| F02M 25/07 | (2006.01) |
| F02D 41/00 | (2006.01) |
| F02D 13/02 | (2006.01) |
| F02B 37/18 | (2006.01) |

(52) U.S. Cl.
CPC ............ *F02D 41/0007* (2013.01); *F02B 37/18* (2013.01); *F02D 13/0242* (2013.01); *F02M 25/0707* (2013.01); *F02M 25/0709* (2013.01); *Y02T 10/144* (2013.01); *Y02T 10/47* (2013.01)

(58) Field of Classification Search
USPC ................................................ 60/602, 605.2
See application file for complete search history.

(56) References Cited

U.S. PATENT DOCUMENTS

| | | | | |
|---|---|---|---|---|
| 5,791,146 | A | * | 8/1998 | Dungner ...................... 60/605.2 |
| 5,794,445 | A | * | 8/1998 | Dungner ...................... 60/605.2 |
| 6,595,183 | B1 | | 7/2003 | Olofsson |
| 7,287,378 | B2 | | 10/2007 | Chen et al. |
| 7,490,466 | B2 | * | 2/2009 | Robel et al. ..................... 60/280 |
| 8,069,663 | B2 | | 12/2011 | Ulrey et al. |
| 8,479,511 | B2 | | 7/2013 | Pursifull et al. |
| 8,495,992 | B2 | | 7/2013 | Roth |
| 8,539,770 | B2 | | 9/2013 | Williams |
| 8,601,811 | B2 | | 12/2013 | Pursifull et al. |
| 8,701,409 | B2 | | 4/2014 | Pursifull et al. |
| 8,944,034 | B2 | * | 2/2015 | Gingrich et al. ............. 60/605.2 |
| 2011/0000470 | A1 | | 1/2011 | Roth |
| 2012/0023935 | A1 | | 2/2012 | Pursifull et al. |

FOREIGN PATENT DOCUMENTS

WO    2013111648 A1    1/2013

OTHER PUBLICATIONS

Ulrey, Joseph N. et al., "Dedicated EGR Cylinder Post Combustion Injection," U.S. Appl. No. 13/915,445, filed Jun. 11, 2013, 34 pages.
Ulrey, Joseph N. et al., "Methods and Systems for Boost Control," U.S. Appl. No. 13/965,952, filed Aug. 13, 2013, 40 pages.

* cited by examiner

*Primary Examiner* — Thai Ba Trieu
*Assistant Examiner* — Dapinder Singh
(74) *Attorney, Agent, or Firm* — Julia Voutyras; Alleman Hall McCoy Russell & Tuttle LLP

(57) ABSTRACT

Methods and systems are provided for a boosted engine having a split exhaust system. One method includes reducing knock by flowing a combination of exhaust from towards the end of an exhaust stroke and blowthrough air to the intake of a compressor via a compressor inlet valve.

20 Claims, 5 Drawing Sheets

FIG. 5

| Condition | Exhaust Valve timing | Exhaust Destination |
|---|---|---|
| Engine Start | Exh_1 closed & deactivated | No exhaust gases to turbine |
| | Exh_2 opens before BDC and closes just after TDC | All exhaust directed to emission control device |
| | CIV closed & deactivated | No blowthrough to compressor inlet |
| Tip-in | Exh_1 opens just before BDC and closes well before TDC | Blowdown exhaust portion directed to turbine |
| | Exh_2 opens as Exh_1 is at maximum lift around midpoint of exhaust stroke and closes before TDC | Scavenged exhaust portion directed to emission control device |
| | CIV opens toward end of exhaust stroke before TDC and closes well after TDC overlapping with intake valves | Mix of blowthrough and LP EGR directed to compressor inlet |
| Throttled Conditions | Exh_1 opens just before BDC and closes well before TDC | Blowdown exhaust portion directed to turbine |
| | Exh_2 opens about midpoint of exhaust stroke and closes just after TDC | Scavenged exhaust portion directed to emission control device |
| | CIV closed & deactivated | No blowthrough to compressor inlet |
| Unstable combustion | Exh_1 opens just before BDC and closes well before TDC | Blowdown exhaust portion directed to turbine |
| | Exh_2 opens as Exh_1 is at maximum lift around midpoint of exhaust stroke and closes before TDC | Scavenged exhaust portion directed to emission control device |
| | CIV opens well before TDC and closes well after TDC overlapping with intake valves; fuel may be injected into blowthrough | Mix of blowthrough, LP EGR and uncombusted fuel to compressor inlet |
| Tip-out | Exh_1 opens before BDC and closes well before TDC | Blowdown exhaust portion directed to turbine |
| | Exh_2 opens as Exh_1 is at maximum lift about halfway through exhaust stroke and closes just after TDC | Scavenged exhaust portion directed to emission control device |
| | CIV closed & deactivated | No blowthrough to compressor inlet |

METHOD TO IMPROVE BLOWTHROUGH VIA SPLIT EXHAUST

TECHNICAL FIELD

The present application relates to a split exhaust in an exhaust system of a boosted internal combustion engine.

BACKGROUND AND SUMMARY

Engines may use boosting devices, such as turbochargers, to increase engine power density. However, engine knock may occur due to increased combustion temperatures. The engine knock may be addressed by retarding spark timing; however, significant spark retard can reduce fuel economy and limit maximum torque. Knock is especially problematic under boosted conditions due to high charge temperatures.

One method to reduce charge temperature and therefore knock, is via blowthrough wherein boosted intake air is blown through the combustion chamber to the exhaust during a positive valve overlap phase.

Another method to suppress knock is by diluting intake air with cooled exhaust gas recirculation (EGR). An example approach of controlling the flow of exhaust gases for EGR is shown by Roth (U.S. Pat. No. 8,495,992) wherein a split exhaust system separates exhaust gases exiting the combustion chamber during blowdown and scavenging phases. Exhaust gases from the blowdown phase are distributed either to the turbine in a turbocharger system or to an EGR system which directs cooled EGR gases to the intake manifold or upstream of the compressor in a turbocharger. Likewise, exhaust gases from the scavenging phase are conveyed to either an emission control device or to an EGR system which delivers cooled gases to the intake manifold or upstream of the compressor. Intake and exhaust valve timings are controlled to regulate the amount of exhaust gases flowing to the turbocharger and/or EGR based on engine operating conditions.

The inventors herein have identified potential issues, including issues with the above approaches to addressing knock limits. For example, an EGR throttle may be placed in the intake, upstream of the compressor, to enhance EGR flow at low backpressure which can make the turbocharger more sensitive to surge and increase pumping losses. Further, a separate EGR cooler may be used to cool the hot exhaust gases before they can be supplied to the intake manifold, thus increasing system costs and requiring packaging space. Further still, in the example where a blowthrough technique is used to reduce knock, additional fuel injected to bring exhaust gases to a stoichiometric ratio can cause over-temperature of the catalyst and affect emissions while increasing fuel consumption. An additional limitation of the blowthrough technique is its restricted use for low engine speeds when compressor outlet pressure is higher than pre-turbine exhaust pressure.

The inventors herein have recognized the above issues and identified approaches to at least partly address the issues. In one example approach, a method for a turbocharged engine with a split exhaust manifold system is provided. The method comprises flowing exhaust through a first exhaust valve to a turbine of the turbocharger, flowing exhaust via a second exhaust valve to upstream of an emission control device and flowing low pressure EGR and blowthrough air via a third valve to upstream of a turbo-compressor into the compressor inlet within a common engine cycle combustion event. By using appropriate valve timing controls, a combination of EGR and blowthrough air techniques can be used to reduce combustion temperatures and thus, mitigate engine knock.

For example, during a combustion cycle of one cylinder of a turbocharged engine, a first blowdown exhaust portion may be directed to the turbine through a first exhaust valve which may open before bottom dead center (BDC) position of the piston to allow 75-80% of the combusted gases to exit. A second exhaust portion may be routed to an emission control device via a second exhaust valve which opens halfway through the exhaust stroke to drain 10-15% of the remaining exhaust gases, termed the "scavenging" portion. The first and second exhaust valves may close before the piston reaches top dead center (TDC) position leaving a portion (~5-10%) of exhaust gases within the cylinder to be evacuated by a third valve coupled to the compressor inlet. The third valve, also known as a "compressor inlet valve", may be opened towards the end of an exhaust stroke, for e.g., before TDC, and closed well past the onset of an intake stroke, for e.g., well after TDC. Consequently, the compressor inlet valve may be open at the same time that one or more intake valves are opened to admit fresh air into the cylinder. Thus, residual exhaust gases within the cylinder towards the end of the exhaust stroke may be flushed out along with fresh blowthrough and transferred to the inlet of the compressor via the compressor inlet valve.

In this way, knock can be reduced by combining blowthrough and EGR in one flow path. By allowing fresh intake air to blow through any residual hot exhaust gases in the cylinder clearance volume, the combustion chamber may be cooled. The mix of exhaust gases and blowthrough air exiting the chamber may be combined with additional fresh air at the compressor, cooled in a charge air cooler (CAC) and eventually recirculated in the engine as EGR to further reduce knock. By using the CAC to cool the residual exhaust gases along with fresh compressed air, a separate EGR cooler may not be required. Further, the EGR throttle may be dispensed with by coupling the compressor inlet valve to the compressor, whereby the mix of exhaust and blowthrough air is drawn into the low pressure inlet of the compressor through the cylinder from a high pressure intake manifold. Since blowthrough air and residual exhaust gases are directed to a compressor inlet at lower pressure, blowthrough may be possible over a greater range of engine speeds. Additionally, exhaust pumping losses encountered in a traditional design, where all exhaust flows into a high pressure turbine inlet, may be reduced. Moreover, since the blowthrough air is not directed to an emission control device, maintaining stoichiometric ratio in the exhaust with an injection of extra fuel may not be required. Overall, a turbocharged engine can be operated with less spark retard from maximum torque.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 5 depicts example valve operations and ensuing exhaust flow via the three passages of one cylinder of the engine in FIG. 1 based on various engine conditions.

DETAILED DESCRIPTION

Figure 1:
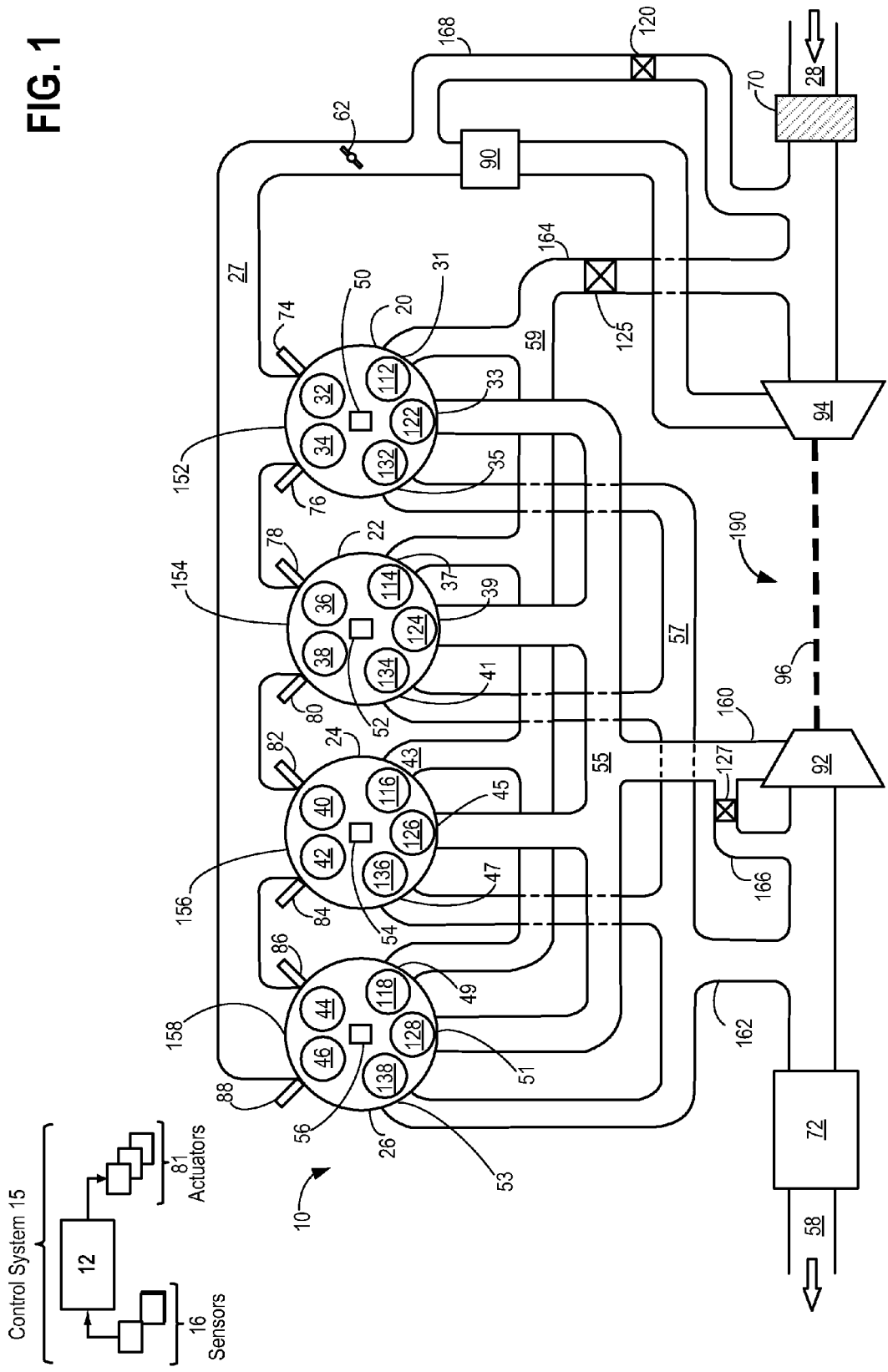
FIG. 1 portrays a schematic depiction of a turbocharged engine system with a split exhaust manifold.
Figure 2:
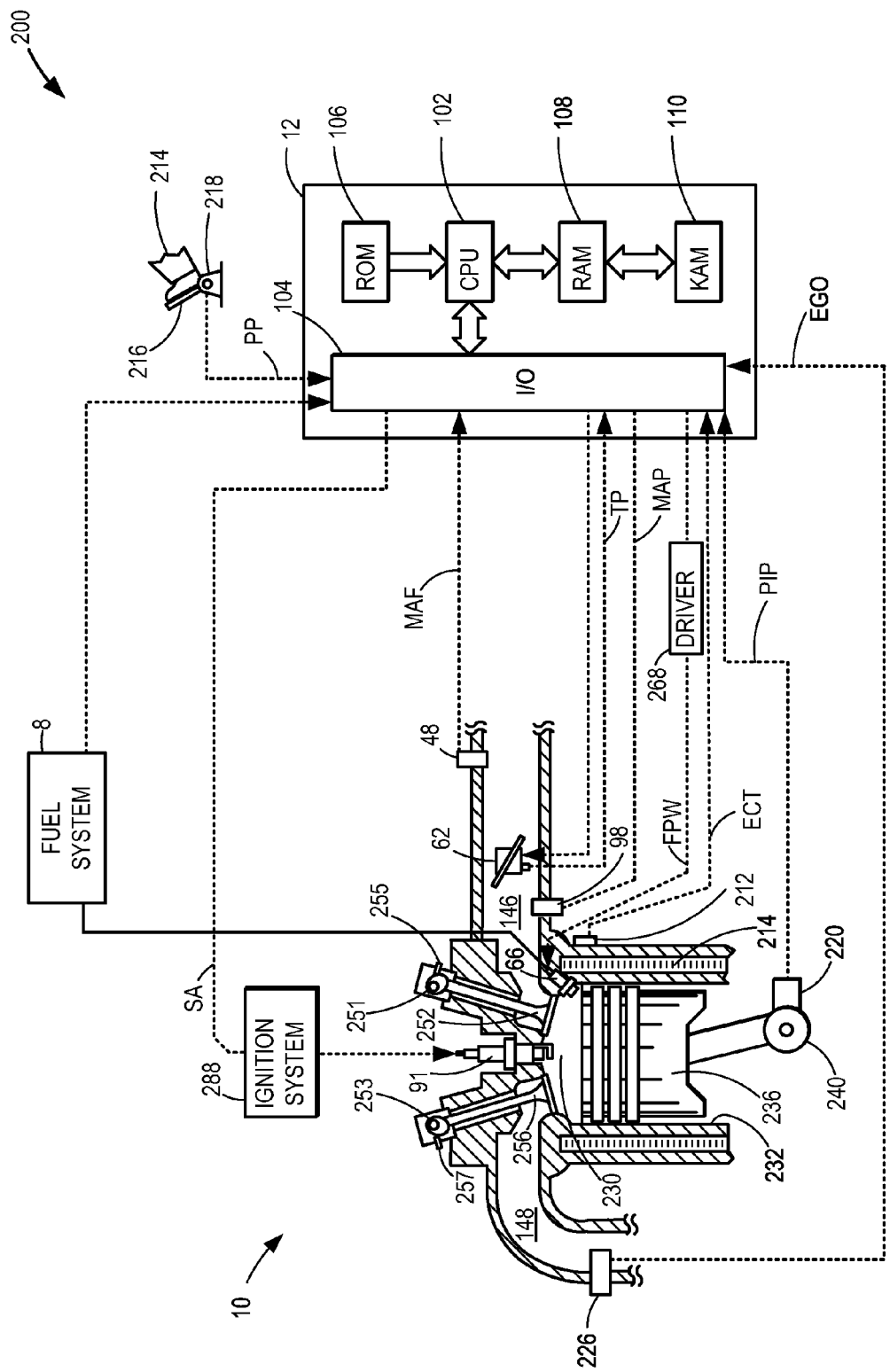
FIG. 2 shows a partial engine view.
Figure 3:
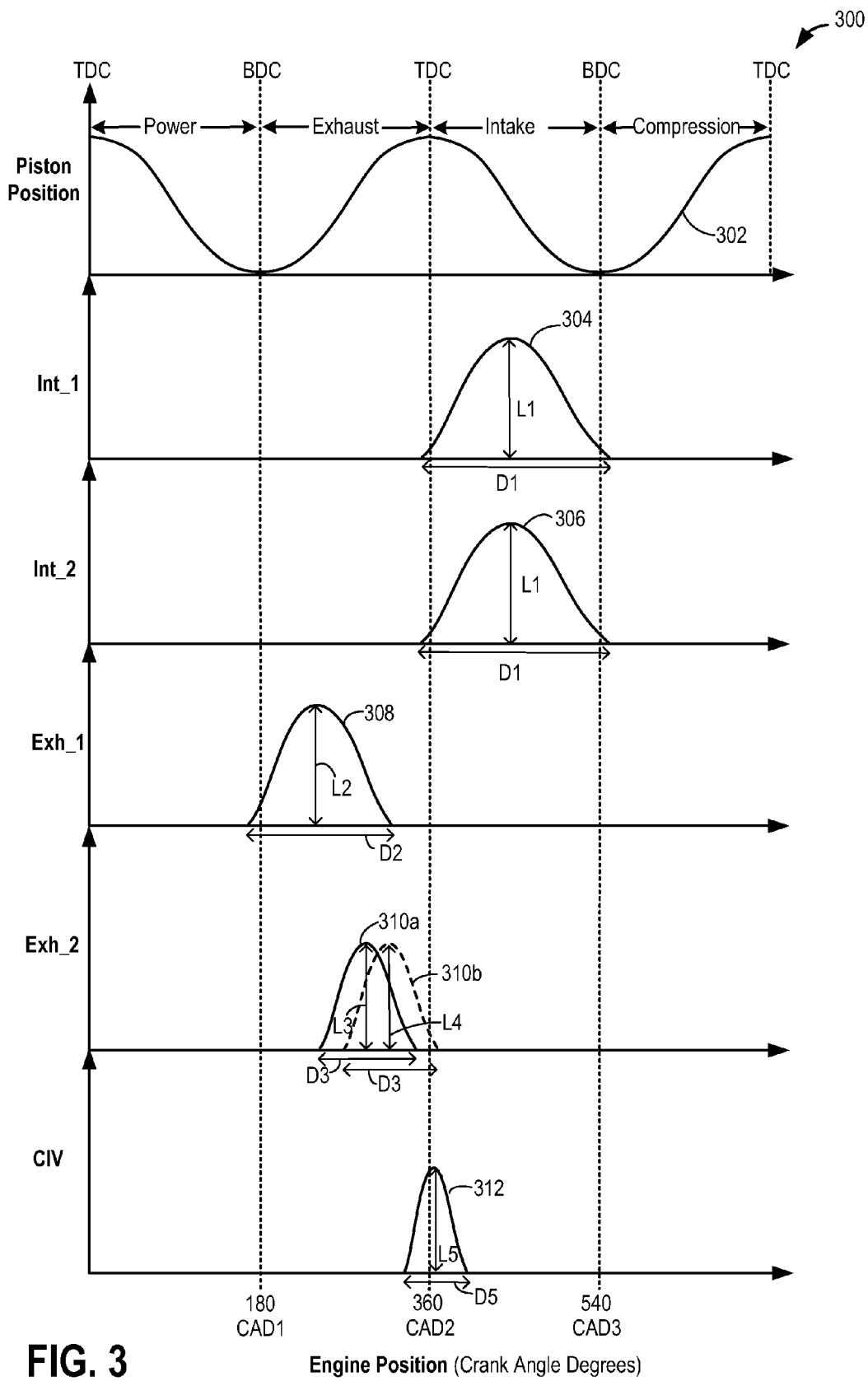
FIG. 3 depicts example cylinder intake valve and exhaust valve timings for one of the engine cylinders of FIG. 1.

The following description relates to systems and methods for controlling knock in an engine, such as the engine system of FIGS. 1-2, by exhausting an engine cylinder through three distinct passages. Specifically, within one combustion cycle, a first or blowdown portion of an exhaust may be guided to a turbine of a turbocharger through a first passage, a second or scavenged portion of an exhaust may be directed to an emission control device via a second passage while a third portion of exhaust gases towards the end of an exhaust stroke mixed with blowthrough air may be directed to an inlet of a compressor in a turbocharger through a third passage. Each cylinder of the engine, thus, may comprise five valves: two intake valves, two exhaust valves and one compressor inlet valve. An engine controller may be configured to perform a control routine, such as the routine of FIG. 4, to operate the compressor inlet valve based on a variety of engine operating conditions such as those shown in FIG. 5. The compressor inlet valve timings may be coordinated with timings of the exhaust valves as well as the intake valves to allow for EGR and blowthrough (FIG. 3).

In the following description, a valve being operational or activated indicates that it is opened and/or closed according to determined timings during the combustion cycle for a given set of conditions. Likewise, a valve being deactivated or inoperative indicates that the valve is maintained closed, unless otherwise stated.

FIG. 1 shows a schematic diagram of a multi-cylinder internal combustion engine 10, which may be included in a propulsion system of an automobile. Engine 10 may include a plurality of combustion chambers (i.e., cylinders) which may be capped on the top by a cylinder head (not shown). In the example shown in FIG. 1, engine 10 includes combustion chambers 20, 22, 24, and 26, arranged in an inline-4 configuration. It should be understood, however, that though FIG. 1 shows four cylinders, engine 10 may include any number of cylinders in any configuration, e.g., V-6, I-6, V-12, opposed 4, etc.

Each combustion chamber may receive intake air from an intake manifold 27 via an air intake passage 28. Intake manifold 27 may be coupled to the combustion chambers via intake ports. For example, intake manifold 27 is shown in FIG. 1 coupled to cylinders 20, 22, 24, and 26 via intake ports 152, 154, 156, and 158 respectively. Each intake port may supply air and/or fuel to the cylinder it is coupled to for combustion. Each cylinder intake port can selectively communicate with the cylinder via one or more intake valves. Cylinders 20, 22, 24, and 26 are shown in FIG. 1 with two intake valves each. For example cylinder 20 has two intake valves 32 and 34, cylinder 22 has two intake valves 36 and 38, cylinder 24 has two intake valves 40 and 42, and cylinder 26 has two intake valves 44 and 46. In one example, an intake passage may be formed from intake manifold 27 selectively communicating with each intake valve. In other embodiments, an intake passage for a single cylinder may be split close to the cylinder into two adjacent paths with a wall in-between, each split path of the passage communicating with a single intake valve. In another example, each of the two intake valves may be controlled to open at specific engine speeds and therefore, may communicate through a common intake port with the intake manifold.

Each combustion chamber may exhaust combustion gases via one or more exhaust ports coupled thereto. Cylinders 20, 22, 24 and 26 are shown in FIG. 1 each coupled to two exhaust ports respectively for channeling the blowdown and scavenging portions of the combustion gases separately. For example, exhaust ports 33 and 35 are coupled to cylinder 22, exhaust ports 39 and 41 are coupled to cylinder 22, exhaust ports 45 and 47 are coupled to cylinder 24 and exhaust ports 51 and 53 are coupled to cylinder 26. Each exhaust port can selectively communicate with the cylinder it is coupled to via an exhaust valve. For example, exhaust ports 33, 35, 39, 41, 45, 47, 51, and 53 communicate with their respective cylinders via their respective exhaust valves 122, 132, 124, 134, 126, 136, 128, and 138.

This being a split manifold system, exhaust ports 33, 39, 45, and 51 may lead into an exhaust manifold 55 while exhaust ports 35, 41, 47, and 53 may combine into an exhaust manifold 57. The exhaust manifolds in this system may be configured to exhaust the combustion products from cylinders 20, 22, 24 and 26.

Engine 10 may include a turbocharger 190. Turbocharger 190 may include an exhaust turbine 92 and an intake compressor 94 coupled on a common shaft 96. A wastegate 127 may be coupled across turbine 92. Specifically, wastegate 127 may be included in a bypass 166 coupled between an inlet and outlet of the exhaust turbine to control an amount of boost provided by the turbine.

The exhaust manifolds may be designed to separately channel the blowdown and scavenging portions of the exhaust. Exhaust manifold 55 may channel the blowdown pulse of the exhaust to turbine 92 of turbocharger 190 via pipe 160 while exhaust manifold 57 may channel the scavenging portion of exhaust via pipe 162 to downstream of turbine 92 and upstream of an emission control device 72. For example, exhaust valves 122, 124, 126, and 128 channel the blowdown portion of the exhaust gases through exhaust manifold 55 and pipe 160 to the turbine while exhaust valves 132, 134, 136, and 138 channel the scavenging portion of exhaust gases through exhaust manifold 57 via pipe 162 to an emission control device 72.

Exhaust gases exiting turbine 92 may pass through emission control device 72 as well. Emission control device 72 can include multiple catalyst bricks, in one example. In another example, multiple emission control devices, each with multiple bricks, can be used. In some examples, emission control device 72 may be a three-way type catalyst. In other examples, emission control device 72 may include one or a plurality of a diesel oxidation catalyst (DOC), and a selective catalytic reduction catalyst (SCR). After passing through emission control device 72, exhaust gas may be directed out to a tailpipe 58.

Each cylinder of engine 10 may also comprise a fifth valve, termed "compressor inlet valve", in addition to two intake and two exhaust valves as shown in FIG. 1. This fifth valve can also be termed a third exhaust valve. For example cylinders 20, 22, 24, and 26 include compressor inlet valves 112, 114, 116, and 118 respectively which are coupled to their respective ports 31, 37, 43 and 49. Further, each of the ports communicating with the compressor inlet valves may combine into a distinct manifold 59 which may be connected via pipe 164 to intake 28 upstream of compressor 94 and downstream of air filter 70. For example, compressor inlet valve 112 may be opened in cylinder 20 towards the end of an exhaust stroke to allow residual exhaust gases to flow through to the inlet of compressor 94. Further, compressor inlet valve 112 may remain open past top dead center (TDC) position of the piston to overlap with intake valves 32 and/or 34 of cylinder 20 to allow fresh intake air to blowthrough the combustion chamber and flush out any remaining exhaust to compressor 94. Valve 125 may be included in pipe 164 to control the flow of EGR and blowthrough air into the compressor inlet.

In one example, a quantity of blowthrough air and EGR being supplied to the compressor inlet may be controlled by changing timing, lift and/or duration of one or more compressor inlet valves 112, 114, 116 and 118. In another example, valve 125 in pipe 164 may be operated to control the quantity of blowthrough air and EGR being delivered to compressor 94 and the compressor inlet valve(s) may be operated with fixed timings, lift and durations.

Thus, combusted gases exiting a cylinder may be separated into three parts via three distinct passages which include two exhaust passages formed by the split exhaust manifold and one passage connecting the compressor inlet valve to upstream of the turbo-compressor. For example, in one combustion cycle, a first exhaust valve 122 of cylinder 20 may channel a first portion of the exhaust, namely the blowdown portion, to turbine 92 via a first passage (pipe 160). A second exhaust valve 132 of the same cylinder (20) may direct a second portion of exhaust gases following the blowdown portion to an emission control device 72 via a second passage (pipe 162). The second portion of exhaust gases exiting via the second exhaust valve 132 may primarily be the scavenging portion of exhaust gases. Towards the end of the exhaust stroke, leftover exhaust gases may be cleaned out from the clearance volume of the same cylinder (20) by fresh intake air from blowthrough and transferred to the inlet of turbo-compressor 94 via the compressor inlet valve 112 and a third passage (pipe 164). Specifically, the second portion of exhaust gases is comprised mostly of exhaust gases without any content of fresh air while compressor inlet valve 112 and pipe 164 mostly convey fresh blowthrough air with a smaller content of exhaust gases.

The first exhaust valve may open earlier than the second exhaust valve and compressor inlet valve to capture the blowdown pulse and may be closed at a timing earlier than the second exhaust and compressor inlet valves. The second exhaust valve may open later than the first exhaust valve but earlier than the compressor inlet valve to capture the scavenging portion of exhaust gases. The first exhaust valve may be closed before the compressor inlet valve opens but the second exhaust valve may close after the compressor inlet valve is opened. The second exhaust valve may be closed much before the intake stroke begins and the intake valves are opened whereas the compressor inlet valve may be closed well after the onset of the intake stroke. The intake valves may be opened just before the exhaust stroke ends at TDC position of the piston and may be closed just past the onset of the compression stroke, for e.g., at bottom dead center (BDC) position of the piston. Effectively, the compressor inlet valve may channel residual exhaust gases towards the end of the exhaust stroke and by overlapping with one or more intake valves may also channel blowthrough along with the EGR.

Intake passage 28 may include an air intake throttle 62 downstream of a charge air cooler 90. The position of throttle 62 can be adjusted by control system 15 via a throttle actuator (not shown) communicatively coupled to controller 12. By modulating air intake throttle 62, while operating compressor 94, an amount of fresh air may be inducted from the atmosphere into engine 10, cooled by charge air cooler 90 and delivered to the engine cylinders at compressor (or boosted) pressure via intake manifold 27. To reduce compressor surge, at least a portion of the aircharge compressed by compressor 94 may be recirculated to the compressor inlet. A compressor recirculation passage 168 may be provided for recirculating cooled compressed air from the compressor outlet, downstream of charge-air cooler 90 to the compressor inlet. Compressor recirculation valve 120 may be provided for adjusting an amount of cooled recirculation flow recirculated to the compressor inlet.

In FIG. 1, fuel injectors are shown coupled directly to the combustion chambers for injecting fuel directly therein in proportion to a pulse width of a signal FPW received from controller 12 via an electronic driver, for example. Each cylinder is shown coupled with two injectors per cylinder at each intake valve. For example, fuel injectors 74 and 76 are coupled to cylinder 20, 78 and 80 are coupled to cylinder 22, 82 and 84 are coupled to cylinder 24 while fuel injectors 86 and 88 are coupled to cylinder 26 as shown in FIG. 1. In this manner, the fuel injectors provide what is known as direct injection of fuel into the combustion chamber. Each respective fuel injector may be mounted in the side of the respective combustion chamber or in the top of the respective combustion chamber, for example. In some examples, one or more fuel injectors may be arranged in intake manifold 27 in a configuration that provides what is known as port injection of fuel into the intake ports upstream of the respective combustion chambers. Though not shown in FIG. 1, fuel may be delivered to the fuel injectors by a fuel system including a fuel tank, a fuel pump, a fuel line, and a fuel rail.

In some examples, a distributorless ignition system (not shown) may provide an ignition spark to spark plugs coupled to the combustion chambers in response to controller 12. For example, spark plugs 50, 52, 54, and 56 are shown in FIG. 1 coupled to cylinders 20, 22, 24, and 26, respectively.

Engine 10 may be controlled at least partially by a control system 15 including controller 12 and by input from a vehicle operator via an input device (not shown). Control system 15 is shown receiving information from a plurality of sensors 16 (various examples of which are described herein) and sending control signals to a plurality of actuators 81. As one example, sensors 16 may include turbo-compressor inlet pressure and temperature sensors, and manifold air pressure (MAP) sensors located within the intake passage. Other sensors may include a throttle inlet pressure (TIP) sensor for estimating a throttle inlet pressure (TIP) and/or a throttle inlet temperature sensor for estimating a throttle air temperature (TCT) coupled downstream of the throttle in the intake passage. Additional system sensors and actuators are elaborated below with reference to FIG. 2. As another example, actuators 81 may include fuel injectors, valves 120, 125, and 127, and throttle 62. Controller 12 may receive input data from the various sensors, process the input data, and trigger the actuators in response to the processed input data based on instruction or code programmed therein corresponding to one or more routines. An example control routine is described herein at FIG. 4.

Referring to FIG. 2, it depicts a partial view 200 of a single cylinder of internal combustion engine 10. As such, components previously introduced in FIG. 1 are represented with the same reference numbers and are not re-introduced.

Engine 10 is depicted with combustion chamber (cylinder) 230, coolant sleeve 214, and cylinder walls 232 with piston 236 positioned therein and connected to crankshaft 240. Combustion chamber 230 is shown communicating with intake passage 146 and exhaust passage 148 via respective intake valve 252 and exhaust valve 256. As previously described in FIG. 1, each cylinder of engine 10 may exhaust combustion products along three conduits. In the depicted view 200, exhaust passage 148 represents the first exhaust port leading from the cylinder to the turbine (such as exhaust port 33 of FIG. 1) while the second exhaust conduit and the conduit leading to the compressor inlet are not visible in this view.

As also previously elaborated in FIG. 1, each cylinder of engine 10 may include two (or more) intake valves and two (or more) exhaust valves in addition to a compressor inlet valve. In the depicted view 200, intake valve 252 and exhaust valve 256 are located at an upper region of combustion chamber 230. Intake valve 252 and exhaust valve 256 may be controlled by controller 12 using respective cam actuation systems including one or more cams. The cam actuation systems may utilize one or more of cam profile switching (CPS), variable cam timing (VCT), variable valve timing (VVT) and/or variable valve lift (VVL) systems to vary valve operation. In the depicted example, each intake valve 252 is controlled by an intake cam 251 and each exhaust valve 256 is controlled by an exhaust cam 253. The position of intake valve 252 and exhaust valve 256 may be determined by valve position sensors 255 and 257, respectively.

In alternate embodiments, the intake and/or exhaust valve may be controlled by electric valve actuation. For example, cylinder 230 may alternatively include an intake valve controlled via electric valve actuation and an exhaust valve controlled via cam actuation including CPS and/or VCT systems. In still other embodiments, the intake and exhaust valves may be controlled by a common valve actuator or actuation system, or a variable valve timing actuator or actuation system. Note that the compressor inlet valve may be similarly controlled.

In one example, intake cam 251 includes separate and different cam lobes that provide different valve profiles (e.g., valve timing, valve lift, duration, etc.) for each of the two intake valves of combustion chamber 230. Likewise, exhaust cam 253 may include separate and different cam lobes that provide different valve profiles (e.g., valve timing, valve lift, duration, etc.) for each of the two exhaust valves of combustion chamber 230. Similarly, the compressor inlet valve (not shown in FIG. 2) may be controlled by a camshaft that includes separate and different cam lobes that provide a variety of valve profiles. In another example, intake cam 251 may include a common lobe, or similar lobes, that provide a substantially similar valve profile for each of the two intake valves.

In addition, different cam profiles for the different exhaust valves can be used to separate exhaust gases exhausted at low cylinder pressure from exhaust gases exhausted at exhaust pressure. For example, a first exhaust cam profile can open from closed position the first exhaust valve just before BDC (bottom dead center) of the power stroke of combustion chamber 230 and close the same exhaust valve well before top dead center (TDC) to selectively exhaust blowdown gases from the combustion chamber. Further, a second exhaust cam profile can be positioned to open from close a second exhaust valve at about the mid-point of the exhaust stroke and close it before TDC to selectively exhaust the scavenging portion of the exhaust gases. Further still, a compressor inlet cam profile can be set to open from closed position the compressor inlet valve towards the end of the exhaust stroke. The compressor inlet valve may be closed well after TDC past the onset of the intake stroke enabling an overlap between the compressor inlet valve and one or more of the intake valves which may be opened during the intake stroke.

The compressor inlet valve may be activated or deactivated based on the intake manifold air pressure. Specifically, when intake manifold air pressure is higher than compressor inlet pressure, exhaust gases within the cylinder may be drawn along with blowthrough to the low pressure compressor inlet reducing pumping losses. Conversely, when the manifold air pressure is lower than the compressor inlet pressure, for e.g., under throttled conditions, compressor inlet valve operation may be deactivated during an entire engine cycle to prevent reverse flow of air from the compressor inlet into the intake manifold via the cylinder and the compressor inlet valve. In this example, the exhaust gases may be diverted entirely to the turbine and the emission control device by the two exhaust valves without any blowthrough.

Thus, the timing of the first exhaust valve and the second exhaust valve can isolate cylinder blowdown gases from scavenging portion of exhaust gases while any residual exhaust gases in the clearance volume of the cylinder can be cleaned out with fresh intake air blowthrough during positive valve overlap between the intake valve and compressor inlet valve. By flowing a first portion of the exhaust gas (e.g., higher pressure exhaust) through the turbine and a higher pressure exhaust passage and flowing a second portion of the exhaust gas (e.g., lower pressure exhaust) through catalytic devices and a lower pressure exhaust passage, while a third portion of low pressure exhaust and blowthrough air is circulated to the compressor inlet, combustion temperatures can be reduced while improving the turbine's work efficiency and engine torque.

Continuing with FIG. 2, exhaust gas sensor 226 is shown coupled to exhaust passage 148. Sensor 226 may be positioned in the exhaust passage upstream of one or more emission control devices, such as device 72 of FIG. 1. Sensor 226 may be selected from among various suitable sensors for providing an indication of exhaust gas air/fuel ratio such as a linear oxygen sensor or UEGO (universal or wide-range exhaust gas oxygen), a two-state oxygen sensor or EGO (as depicted), a HEGO (heated EGO), a NOx, HC, or CO sensor, for example. The downstream emission control devices may include one or more of a three way catalyst (TWC), NOx trap, various other emission control devices, or combinations thereof.

Exhaust temperature may be estimated by one or more temperature sensors (not shown) located in exhaust passage 148. Alternatively, exhaust temperature may be inferred based on engine operating conditions such as speed, load, air-fuel ratio (AFR), spark retard, etc.

Cylinder 230 can have a compression ratio, which is the ratio of volumes when piston 236 is at bottom center to top center. Conventionally, the compression ratio is in the range of 9:1 to 10:1. However, in some examples where different fuels are used, the compression ratio may be increased. This may happen, for example, when higher octane fuels or fuels with higher latent enthalpy of vaporization are used. The compression ratio may also be increased if direct injection is used due to its effect on engine knock.

In some embodiments, each cylinder of engine 10 may include a spark plug 91 for initiating combustion. Ignition system 288 can provide an ignition spark to combustion chamber 230 via spark plug 91 in response to spark advance signal SA from controller 12, under select operating modes. However, in some embodiments, spark plug 91 may be omitted, such as where engine 10 may initiate combustion by auto-ignition or by injection of fuel as may be the case with some diesel engines.

In some embodiments, each cylinder of engine 10 may be configured with one or more fuel injectors for providing fuel thereto. As a non-limiting example, cylinder 230 is shown including one fuel injector 66. Fuel injector 66 is shown coupled directly to combustion chamber 230 for injecting fuel directly therein in proportion to the pulse width of signal FPW received from controller 12 via electronic driver 268. In this manner, fuel injector 66 provides what is known as direct injection (hereafter also referred to as "DI") of fuel into combustion cylinder 230. While FIG. 2 shows injector 66 as a side injector, it may also be located overhead of the piston, such as near the position of spark plug 91. Such a position may improve mixing and combustion when operating the engine with an alcohol-based fuel due to the lower volatility of some alcohol-based fuels. Alternatively, the injector may be located overhead and near the intake valve to improve mixing. In an alternate embodiment, injector 66 may be a port injector providing fuel into the intake port upstream of cylinder 230.

Fuel may be delivered to fuel injector 66 from a high pressure fuel system 8 including fuel tanks, fuel pumps, and a fuel rail. Alternatively, fuel may be delivered by a single stage fuel pump at lower pressure, in which case the timing of the direct fuel injection may be more limited during the compression stroke than if a high pressure fuel system is used. Further, while not shown, the fuel tanks may have a pressure transducer providing a signal to controller 12. Fuel tanks in fuel system 8 may hold fuel with different fuel qualities, such as different fuel compositions. These differences may include different alcohol content, different octane, different heat of vaporizations, different fuel blends, and/or combinations thereof etc. In some embodiments, fuel system 8 may be coupled to a fuel vapor recovery system including a canister for storing refueling and diurnal fuel vapors. The fuel vapors may be purged from the canister to the engine cylinders during engine operation when purge conditions are met. For example, the purge vapors may be naturally aspirated into the cylinder via the first intake passage at or below barometric pressure.

Controller 12 is shown in FIG. 2 as a microcomputer, including a microprocessor unit 102, input/output ports 104, an electronic storage medium for executable programs and calibration values shown as a read only memory 106 in this particular example, random access memory 108, keep alive memory 110, and a data bus. Storage medium read-only memory 106 can be programmed with computer readable data representing instructions executable by microprocessor 102 for performing the methods and routines described below as well as other variants that are anticipated but not specifically listed. Controller 12 may receive various signals from sensors coupled to engine 10, in addition to those signals previously discussed, including measurement of inducted mass air flow (MAF) from mass air flow sensor 48; engine coolant temperature (ECT) from temperature sensor 212 coupled to coolant sleeve 214; a profile ignition pickup signal (PIP) from Hall effect sensor 220 (or other type) coupled to crankshaft 240; throttle position (TP) from a throttle position sensor; absolute manifold pressure signal (MAP) from sensor 98, cylinder AFR from EGO sensor 226, and abnormal combustion from a knock sensor and a crankshaft acceleration sensor. Engine speed signal, RPM, may be generated by controller 12 from signal PIP. Manifold pressure signal MAP from a manifold pressure sensor may be used to provide an indication of vacuum, or pressure, in the intake manifold.

Based on input from one or more of the above-mentioned sensors, controller 12 may adjust one or more actuators, such as fuel injector 66, throttle 62, spark plug 91, compressor inlet valve, intake/exhaust valves and cams, etc. The controller may receive input data from the various sensors, process the input data, and trigger the actuators in response to the processed input data based on instruction or code programmed therein corresponding to one or more routines. An example control routine will be described later with regard to FIG. 4.

Now turning to FIG. 3, map 300 depicts example valve timings with respect to a piston position, for an engine cylinder comprising 5 valves: two intake valves, two exhaust valves and one compressor inlet valve, such as described in FIGS. 1-2. The example of FIG. 3 is drawn substantially to scale, even though each and every point is not labeled with numerical values. As such, relative differences in timings can be estimated by the drawing dimensions. However, other relative timings may be used, if desired.

Continuing with FIG. 3, the cylinder is configured to receive intake via two intake valves and exhaust a first blowdown portion to a turbine inlet via a first exhaust valve, exhaust a second scavenging portion to an emission control device via a second exhaust valve and flow a combination of low pressure exhaust and fresh blowthrough air to the inlet of a turbo-compressor via a compressor inlet valve. By adjusting the timing of the opening and/or closing of the compressor inlet valve with that of the two exhaust and two intake valves, residual exhaust gases in the cylinder clearance volume may be cleaned out and recirculated as EGR along with fresh intake blowthrough air.

Map 300 illustrates an engine position along the x-axis in crank angle degrees (CAD). Curve 302 depicts piston positions (along the y-axis), with reference to their location from top dead center (TDC) and/or bottom dead center (BDC), and further with reference to their location within the four strokes (intake, compression, power and exhaust) of an engine cycle.

During engine operation, each cylinder typically undergoes a four stroke cycle including an intake stroke, compression stroke, expansion stroke, and exhaust stroke. During the intake stroke, generally, the exhaust valves close and intake valves open. Air is introduced into the cylinder via the corresponding intake passage, and the cylinder piston moves to the bottom of the cylinder so as to increase the volume within the cylinder. The position at which the piston is near the bottom of the cylinder and at the end of its stroke (e.g. when the combustion chamber is at its largest volume) is typically referred to by those of skill in the art as bottom dead center (BDC). During the compression stroke, the intake valves and exhaust valves are closed. The piston moves toward the cylinder head so as to compress the air within combustion chamber. The point at which the piston is at the end of its stroke and closest to the cylinder head (e.g. when the combustion chamber is at its smallest volume) is typically referred to by those of skill in the art as top dead center (TDC). In a process herein referred to as injection, fuel is introduced into the combustion chamber. In a process herein referred to as ignition, the injected fuel is ignited by known ignition means, such as a spark plug, resulting in combustion. During the expansion stroke, the expanding gases push the piston back to BDC. A crankshaft converts this piston movement into a rotational torque of the rotary shaft. During the exhaust stroke, in a traditional design, exhaust valves are opened to release the residual combusted air-fuel mixture to the corresponding exhaust passages and the piston returns to TDC. In this description, the compressor inlet valve may be opened towards the end of the exhaust stroke while the exhaust valves are closed to flush out residual exhaust gases with blowthrough air.

Curve 304 depicts a first intake valve timing, lift, and duration for a first intake valve (Int_1) while curve 306 depicts a second intake valve timing, lift, and duration for a second intake valve (Int_2) coupled to the intake passage of the engine cylinder. Curve 308 depicts an example exhaust valve timing, lift, and duration for a first exhaust valve (Exh_1) coupled to a first exhaust passage of the engine cylinder, while curves 310a and 310b depict example exhaust valve timings, lifts, and durations for a second exhaust valve (Exh_2) coupled to a second exhaust passage of the engine cylinder. As previously elaborated, the first exhaust passage connects a first exhaust valve to the inlet of a turbine in a turbocharger and the second exhaust passage connects a second exhaust valve to downstream of the turbine and upstream of an emission control device. Curve 312 depicts an example valve timing, lift and duration for a compressor inlet valve (CIV) coupled to a third passage that connects the CIV to the inlet of the turbo-compressor. The first and second exhaust passages and the third passage for flowing EGR and blow-through air may be separate from each other.

In the depicted example, the first and second intake valves are fully opened from a closed position at a common timing (curves 304 and 306), starting substantially closer to intake stroke TDC, just before CAD2 (e.g., at or just before intake stroke TDC) and are closed just after a subsequent compression stroke has commenced past CAD3 (e.g., at or just after BDC). Additionally, when opened fully the two intake valves may be opened with the same amount of valve lift L1 for the same duration of D1. In other examples, the two valves may be operated with a different timing by adjusting the phasing, lift or duration based on engine conditions.

Now turning to the exhaust valves wherein the timing of the first and the second exhaust valves is staggered with that of the compressor inlet valve (CIV). Specifically, the first exhaust valve is opened from a closed position at a first timing (curve 308) that is earlier in the engine cycle than the timing (curves 310a, 310b) at which the second exhaust valve is opened from close and that is earlier than the timing (curve 312) at which the CIV is opened from close. Specifically, the first timing for the first exhaust valve is closer to exhaust stroke BDC, just before CAD1 (e.g., at or just before exhaust stroke BDC) while the timing for opening the second exhaust valve and the CIV is retarded from exhaust stroke BDC, after CAD1 but before CAD2. The first (curve 308) and second (curve 310a) exhaust valves may be closed before the end of the exhaust stroke while the CIV is maintained open past TDC when the intake stroke has commenced to overlap positively with the intake valves. The CIV may be closed, for example, before the midpoint of the intake stroke.

To elaborate, the first exhaust valve may be fully opened from close at or before the start of an exhaust stroke (for e.g., within 10 degrees before BDC), maintained fully open through a first part of the exhaust stroke and may be fully closed before the exhaust stroke ends (for e.g., within 45 degrees before TDC) to collect the blowdown portion of the exhaust pulse. The second exhaust valve (curve 310a) may be fully opened from a closed position at about the midpoint of the exhaust stroke (for e.g., between 60 and 90 degrees past BDC), maintained open through a second portion of the exhaust stroke and may be fully closed before the exhaust stroke ends (for e.g., within 20 degrees before TDC) to exhaust the scavenging portion of the exhaust. The CIV may be fully opened from close towards the end of the exhaust stroke (for e.g., within 25 degrees before TDC), may be maintained fully open at least until a subsequent intake stroke has commenced and may be fully closed well after exhaust stroke TDC (for e.g., within 30 degrees past TDC). The intake valves may be fully opened from close just before the exhaust stroke ends (for e.g., within 10 degrees before TDC), maintained open through the intake stroke and may be fully closed at or just past the onset of the compression stroke (for e.g., within 10 degrees past BDC). Therefore, the CIV and the intake valves, as shown in FIG. 3, may have a positive overlap phase (for e.g., from within 10 degrees before TDC until 30 degrees past TDC) to allow blowthrough with EGR. This cycle, wherein all five valves are operational, may repeat itself based on engine operating conditions.

Further, the first exhaust valve may be fully closed and maintained closed well before the CIV is fully opened while the second exhaust valve may be fully closed just after the CIV is opened. Further, the first and second exhaust valves may overlap with each other, the second exhaust valve and the CIV may overlap minimally with each other but, the first exhaust valve may not overlap with the CIV.

As mentioned earlier, the CIV may be operational when the MAP is higher than the compressor inlet pressure. However, when the MAP is lower than the compressor inlet pressure, the CIV may be deactivated and maintained closed until the MAP is higher than the pressure at the compressor inlet. Specifically, the CIV may be closed, if open, or maintained closed to prevent reverse air flow from the engine intake via the cylinder into the intake manifold. Herein, the timing of the first exhaust valve may be the same as the first timing as depicted in curve 308 of FIG. 3: opening just before BDC when the exhaust stroke commences and closing well before the end of the exhaust stroke TDC. However, the second exhaust valve may be opened about halfway through the exhaust stroke, and may be maintained open (curve 310b) until just after the end of the exhaust stroke (for e.g., 10 degrees past TDC) to drain the cylinder of its exhaust. The second exhaust valve may be fully closed at or just after the exhaust stroke ends and positive valve overlap may not occur between the second exhaust valve and the intake valves to avoid blowthrough.

Essentially, the timings of the second exhaust valve may be varied based on activation or deactivation of the CIV. When MAP is higher than compressor inlet pressure and the CIV is operational through the combustion cycle, the second exhaust valve may be opened about halfway through the exhaust stroke and closed well before the end of the exhaust stroke (curve 310a). In one example, the second exhaust valve may be opened about 80 degrees past BDC and closed within 20 degrees before TDC. When MAP is lower than compressor inlet pressure and the CIV is deactivated and maintained closed, the second exhaust valve may be opened about halfway through the exhaust stroke and fully closed as the exhaust stroke ends at or just past TDC (curve 310b). For example, the second exhaust valve may be opened about 90 degrees past BDC and may be closed within 10 degrees past TDC. In the example shown in FIG. 3 for the second exhaust valve, curves 310a and 310b may have the same duration D3. In other examples, the durations may be varied along with the phasing of the second exhaust valve.

Additionally, the first exhaust valve may be opened at a first timing with a first amount of valve lift L2 while the second exhaust valve may be opened with a second amount of valve lift L3 (curve 310a) and the CIV may be opened with a third amount of valve lift L5. Further still, the first exhaust valve may be opened at the first timing for a duration D2 while the second exhaust valve may be opened for a duration D3 and the CIV may be opened for a duration D5. It will be appreciated that in alternate embodiments, the two exhaust valves may have the same amount of valve lift and/or same duration of opening while opening at differently phased timings.

In this way, by using staggered valve timings, engine efficiency and power can be increased by separating exhaust gases released at higher pressure (e.g., expanding blow-down exhaust gases in a cylinder) from residual exhaust gases at low pressure (e.g., exhaust gases that remain in the cylinder after blow-down) into the different passages. By conveying low pressure residual exhaust gases as EGR along with blow-through air to the compressor inlet, combustion chamber temperatures can be lowered thereby, reducing knock and spark retard from maximum torque. Further, since the exhaust gases at the end of the stroke are directed to either downstream of a turbine or upstream of a compressor which are both at lower pressures, exhaust pumping losses can be minimized to improve engine efficiency.

Thus, exhaust gases can be used more efficiently than simply directing all the exhaust gas of a cylinder through a single, common exhaust port to a turbocharger turbine. As such, several advantages may be achieved. For example, the average exhaust gas pressure supplied to the turbocharger can be increased by separating and directing the blowdown pulse into the turbine inlet to improve turbocharger output. Additionally, fuel economy may be improved because blowthrough air is not routed to the catalyst, being directed to the compressor inlet instead, and therefore, excess fuel may not be injected into the exhaust gases to maintain a stoichiometric ratio.

Figure 4:
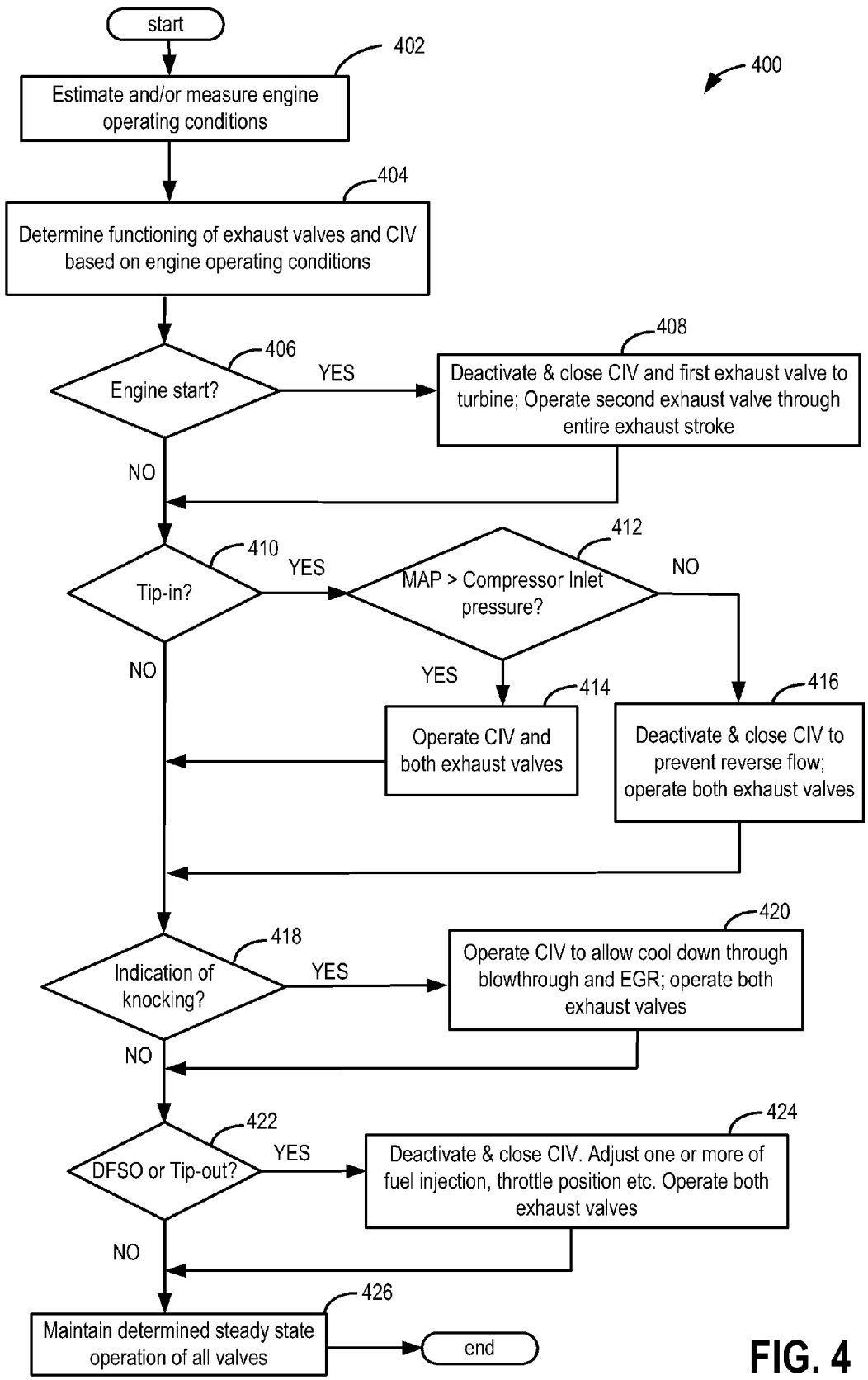
FIG. 4 is an example flow chart illustrating a routine to activate a compressor inlet valve based on various engine operating conditions.

Now turning to FIG. 4, an example routine 400 is shown for operating the compressor inlet valve (CIV) and the two exhaust valves according to engine conditions. Specifically, the routine may determine different valve positions based on engine operating conditions including combustion stability, engine limitations, and transients amongst other conditions. Further, the valves are operated as explained below through one or more combustion cycles for the duration of the specific engine condition.

At 402, engine operating conditions may be estimated and/or measured. These may include, for example, ambient temperature and pressure, engine temperature, engine speed, crankshaft speed, battery state of charge, fuels available, catalyst temperature, driver demanded torque, etc. At 404, based on the estimated engine operating conditions, the functioning and operation of all valves may be determined. For example, at steady state conditions, the CIV may be operated during an engine combustion cycle to enable blowthrough, reduce exhaust pumping losses and improve torque.

At 406, it may be determined if engine start conditions are present. An engine start may include cranking the engine from rest via a motor, such as a starter motor. If engine start conditions are present, at 408 the CIV and the first exhaust valve are deactivated and maintained closed while the entire exhaust portion is delivered to the emission control device via the second exhaust valve. To elaborate, during a combustion cycle under engine start conditions, the second exhaust valve may fully open just before the exhaust stroke commences and may be fully closed at the onset of the intake stroke. During a cold-start, the hot exhaust gases may assist in bringing the emission control device to light-off temperature. During a hot-start, the initial emissions may be cleaned out by the emission control device which has attained light-off temperature.

At 410, it may be determined if a tip-in is expected. In order to speed exhaust turbine spool-up in a turbocharged system in preparation for tip-in, the first exhaust valve may be activated, in addition to the second exhaust valve, to direct the blowdown portion of the exhaust to the turbine. Specifically, the first exhaust valve may be opened just as the exhaust stroke commences and closed well before the end of the exhaust stroke to target the blowdown pulse to the turbine. The second exhaust valve may be opened about midway through the exhaust stroke and closed well before the end of the exhaust stroke to channel the scavenged portion of the exhaust to the emission control device.

If a tip-in is confirmed, at 412, the routine may determine if manifold air pressure (MAP) is higher than turbo-compressor inlet pressure. If MAP is confirmed to be higher, the CIV may be activated, at 414, to open towards the end of the exhaust stroke to allow EGR and blowthrough air to be transferred to the compressor inlet.

If MAP is lower than compressor inlet pressure, the CIV may be closed or maintained closed and deactivated to prevent reverse air flow. For example, under throttled conditions the intake air may want to flow from upstream of the compressor to the intake manifold via the combustion chamber. To prevent this reverse flow, the CIV may be deactivated and closed while the second exhaust valve may be opened about halfway through the exhaust stroke and closed at or just past the onset of the intake stroke.

At 418, it may be determined if there is any indication of engine knock. If the presence of engine knock is confirmed, at 420, the routine includes operating the CIV to enable EGR and blowthrough which can cool combustion chamber temperatures. Specifically, the CIV may be opened towards the end of the exhaust stroke and closed well past the onset of the intake stroke. As described earlier, the two exhaust valves may be operated to direct the blowdown and scavenged portions to the turbine and the emission control device, respectively. Engine knock may be due to an abnormal combustion event occurring in a cylinder after a spark ignition event of the cylinder. To promote combustion stability, additional fuel may be injected into the blowthrough air to enrich the EGR gases. By injecting fuel to enrich EGR, engine knock may be mitigated without the use of spark retard, thereby, improving engine torque.

Next, at 422, it may be determined if deceleration fuel shut-off (DFSO) or tip-out conditions are met. The DFSO event may be in response to torque demand being lower than a threshold, such as during a tip-out. Therein, cylinder fuel injection may be selectively stopped. If a DFSO or tip-out is confirmed, then at 424, the CIV may be deactivated and closed or maintained closed to reduce an amount of residuals delivered to the engine intake during the deceleration. Specifically, the CIV is closed and/or maintained closed during entire combustion cycles as long as DFSO or tip-out lasts. Further, the exhaust gases may be channeled as two portions: one earlier blowdown portion via the first exhaust valve and a second scavenged portion via the second exhaust valve. Engine settings may be adjusted to maximize engine torque response after exit from DFSO. For example, the throttle may be positioned so as to allow for best transient response on tip-in.

If none of the engine conditions described above are present, at 426, the valves may be operated based on steady state conditions. In one example, during steady state conditions, if MAP is higher than compressor inlet pressure, the CIV may be activated and opened towards the end of the exhaust stroke and closed well after the onset of the intake stroke similar to step 414. In another example, if MAP is lower than the compressor inlet pressure, the CIV may be deactivated and maintained closed as at step 416. The two exhaust valves may be operated as described earlier: if the CIV is operational during the combustion cycle, both exhaust valves close well before the end of the exhaust stroke. If the CIV is inoperative, the blowdown portion of the exhaust continues to be delivered to the turbine via the first exhaust while the second exhaust valve drains the remaining exhaust gases to the emission control device. Herein, blowthrough and EGR may not be channeled to the compressor inlet. In yet another example, under non-steady state conditions, valve operation may be modified and adapted to existing conditions.

Various examples of engine conditions and resulting valve adjustments are now elaborated with reference to FIG. 5.

Specifically, table 500 lists example combinations of exhausting a cylinder along three distinct passages comprising a first exhaust passage through a first exhaust valve leading to an exhaust turbine inlet, a second passage through a second exhaust valve leading to an emission control device and a third passage from a compressor inlet valve to upstream of the turbo-compressor. As such, the three portions of exhaust may be expelled separately and at different times within the same engine combustion cycle as elaborated earlier with reference to FIG. 3. Further, during all conditions described below, the intake valves are operational as described with reference to FIG. 3. Both intake valves may be opened fully at the onset of the intake stroke (e.g., at or just before TDC exhaust stroke) and closed fully at the end of the intake stroke (e.g., at or just after BDC intake stroke).

During an engine start condition, the CIV and the first exhaust valve may be deactivated and maintained closed while the second exhaust valve is operational and open through the entire exhaust stroke (for e.g., from just before the end of the power stroke BDC to just after the end of the exhaust stroke TDC) whereby all the exhaust is directed to the emission control device. Therefore, as the engine is started from rest or shutdown, neither the turbine nor the compressor inlet receives any portion of the exhaust. Further, blowthrough may be prevented by minimizing positive valve overlap between the second exhaust valve and one or more intake valves to avoid transferring a lean exhaust to the emission control device.

During a tip-in, both exhaust valves may be activated and operational. A blowdown portion of the exhaust may be directed to the turbine by opening the first exhaust valve just before the end of the power stroke BDC and closing it before the end of the exhaust stroke. A second portion of the exhaust gases after blowdown may be delivered to an emission control device by opening the second exhaust valve about midway during the exhaust stroke. Both exhaust valves may be closed before the end of the exhaust stroke TDC. A final portion of low pressure exhaust (LP-EGR) combined with fresh blowthrough air may be conveyed to the turbo-compressor inlet by operating the CIV to open towards the end of the exhaust stroke and by maintaining a positive valve overlap with one or more intake valves during the intake stroke. The CIV may be closed well after the onset of the intake stroke for e.g., well past TDC. Thus, the exhaust turbine may spool up for a tip-in with energy recovered from the blowdown pulse of the exhaust while knock and other combustion instabilities may be reduced by recirculating LP-EGR and blowthrough via the compressor inlet. The operation of the CIV may depend on MAP. The CIV may be opened during the combustion cycle solely when the manifold air pressure is higher than compressor inlet pressure to enable the flow of fresh intake air through the cylinder and the CIV to transfer residual low pressure exhaust gases to the compressor inlet.

When an engine is operating under throttled conditions, the manifold air pressure may be lower than the compressor inlet pressure. Therefore, the CIV may be deactivated and maintained closed during the cycle while the two exhaust valves are operational to drain combusted gases from the cylinder. The blowdown pulse from the exhaust may be directed to the turbine of the turbocharger while the scavenged portion of the exhaust may be conveyed to the emission control device. The first exhaust valve may open just before the exhaust stroke begins and may close well before the exhaust stroke ends. The second exhaust valve may open about halfway through the exhaust stroke and close at TDC or just after the end of the exhaust stroke past TDC.

During unstable combustion conditions when engine knock may be present, the CIV may be activated and opened towards the end of the exhaust stroke and may be fully closed well after the intake stroke is initiated to allow for EGR and blowthrough. Additionally, extra fuel may be injected into the blowthrough air to make the EGR richer and improve combustion stability. Thus, the CIV may transfer a mix of uncombusted fuel, low pressure exhaust gases (as LP-EGR) and blowthrough air to the compressor inlet for recirculation to the cylinder. The two exhaust valves are operated similarly to that described for the tip-in condition and may be opened during part of the exhaust stroke and closed well before the end of the exhaust stroke.

During a tip-out condition, as the engine is disabled, the CIV may be deactivated and maintained closed to prevent any EGR from flowing through the engine. The two exhaust valves are operational whereby, the first portion of exhaust gases is discharged through the first exhaust valve to the turbine while the remaining portion of exhaust gases is discharged through the second exhaust valve to the emission control device. The first exhaust valve is opened at or just before the end of the power stroke and is closed well before the end of the exhaust stroke. The second exhaust valve is opened halfway through the exhaust stroke and closed just after the intake stroke commences.

In this way, a compressor inlet valve may be used with a split exhaust system to improve combustion stability while maintaining engine torque. By flowing a mix of low pressure exhaust gases and fresh blowthrough air through the cylinder, combustion temperatures may be reduced, thereby, alleviating knock. Since the LP-EGR and blowthrough air is directed to a low pressure compressor inlet, and not a high pressure turbine inlet, exhaust pumping losses are reduced, an EGR throttle is not required to draw exhaust gases into the compressor inlet and blowthrough is not limited to low engine speeds. Additionally, fuel economy may be improved since blowthrough air is directed to the compressor and does not affect the stoichiometric ratio of the exhaust entering the emission control device. Overall, engine torque is enhanced by using blowthrough and EGR for knock mitigation and reducing the reliance on spark retard for controlling knock.

While the above examples may include two exhaust valves per cylinder and a third compressor inlet valve to drain exhaust gases from the cylinder, another representation may include systems with exactly one exhaust valve and one compressor inlet valve (CIV) per cylinder, at least for some cylinders and potentially all cylinders. The CIV may be termed a "second exhaust valve" in this representation. This configuration may use the various methods and components described above herein, with the exhaust valve coupled to the inlet of the turbine via a first passage and the CIV coupled to the compressor inlet via a second passage.

With reference to FIG. 1, cylinder 20 may include a first exhaust valve 122 connected via manifold 55 and pipe 160 to the inlet of turbine 92 of a turbocharger 190 and a compressor inlet valve 112 connected to the inlet of compressor 94 via manifold 59 and pipe 164. Further, cylinder 20 may not include exhaust valve 132. Thus, all exhaust gases may be drained from cylinder 20 via exhaust valve 122 and compressor inlet valve 112 with a larger portion of gases exiting through exhaust valve 122 and a smaller portion of exhaust exiting through compressor inlet valve 112. The exhaust gases leaving cylinder 20 via compressor inlet valve 112 may be combined with fresh blowthrough air from the intake manifold 27.

One example method of operation may include operating the turbocharged engine under boosted operation condition, with an intake compressor compressing intake air before delivering it through intake valves to a direct injected cylinder. The method may include delivering a first portion of exhaust from a cylinder to a turbine inlet of a turbocharger past a first exhaust valve, the first exhaust valve having an earlier opening and closing timing (relative to the compressor inlet valve) without positive valve overlap with the one or more intake valves. Additionally, the method includes, concurrent in the same combustion cycle as the delivering of the first portion, delivering a combination of EGR and blowthrough air from the cylinder to an inlet of the compressor of the turbocharger past the compressor inlet valve of the cylinder having a later opening and closing timing (relative to the first exhaust valve) and with positive valve overlap with the one or more intake valves.

This example representation may further include the compressor inlet valve being activated and opened to flow exhaust to upstream of the compressor within an engine cycle solely during conditions where intake manifold air pressure is higher than compressor inlet air pressure. Further, the compressor inlet valve may be deactivated and maintained closed throughout an engine cycle when intake manifold pressure is lower than compressor inlet pressure. In this case, all exhaust gases may be drained from the cylinder via the first exhaust valve.

Note that the example control and estimation routines included herein can be used with various engine and/or vehicle system configurations. The control methods and routines disclosed herein may be stored as executable instructions in non-transitory memory. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for operating an engine, the engine having a cylinder, the cylinder having a first exhaust valve and a second exhaust valve and a third valve, the method comprising:
    directing exhaust flow through the first exhaust valve of the cylinder to a turbine of a turbocharger;
    directing exhaust flow through the second exhaust valve of the cylinder to downstream of the turbine and upstream of an emission control device; and
    directing exhaust flow through the third valve of the cylinder to upstream of a compressor of the turbocharger.

2. The method of claim 1 further comprising:
    directing a first blowdown portion of an exhaust pulse through the first exhaust valve;
    directing a second scavenging portion of the exhaust pulse through the second exhaust valve to the emission control device; and
    directing a combination of blowthrough air and residual exhaust gas recirculation (EGR) via the third valve to the inlet of the compressor.

3. The method of claim 1 wherein, the third valve is activated to open towards an end of an exhaust stroke before a top dead center (TDC) position of a piston in the cylinder to provide EGR gases to upstream of the compressor.

4. The method of claim 1 wherein, the third valve is closed well after an onset of an intake stroke to have a positive overlap with one or more intake valves of the cylinder to provide blowthrough air to upstream of the compressor.

5. The method of claim 1 wherein the first and second exhaust valves are closed well before TDC position of a piston towards the end of the exhaust stroke.

6. The method of claim 1 wherein the third valve is only activated and opened to flow exhaust to upstream of the compressor within an engine cycle during conditions where intake manifold air pressure is higher than compressor inlet air pressure.

7. The method of claim 1 wherein the third valve is deactivated and maintained closed throughout an engine cycle when intake manifold pressure is lower than compressor inlet pressure.

8. The method of claim 1 wherein the EGR is low pressure EGR.

9. A method for operating a boosted engine with a split exhaust, the boosted engine including a cylinder, the cylinder having a first exhaust valve and a second exhaust valve and a third valve, the method comprising:
    delivering a first portion of exhaust from the first exhaust valve of the cylinder to a turbine of a turbocharger;
    delivering a second portion of exhaust from the second exhaust valve of the cylinder to an emission control device and;
    delivering a combination of EGR and blowthrough air from the third valve of the cylinder to an inlet of a compressor of the turbocharger.

10. The method of claim 9 wherein the first exhaust portion is directed via a first exhaust passage from a first exhaust valve of the cylinder.

11. The method of claim 9 wherein the second exhaust portion is directed via a second exhaust passage from a second exhaust valve of the cylinder.

12. The method of claim 9 wherein the EGR and blowthrough portion is directed via a third passage from a third valve of the cylinder.

13. The method of claim 12 wherein the third valve is operated to open towards an end of an exhaust stroke and close only after a TDC position of a piston in the cylinder to overlap with an opening of one or more intake valves near the TDC position of the piston.

14. The method of claim 13 further comprising operating the third valve only when manifold pressure is higher than compressor inlet pressure during an engine cycle.

15. The method of claim 12 wherein the third valve is maintained closed during a combustion cycle when compressor inlet pressure is higher than intake manifold pressure.

16. The method of claim 12 wherein the EGR is low pressure EGR.

17. The method of claim 9 wherein the first and second exhaust portions and the combination or EGR and blow-through are all provided within a common engine cycle combustion event.

18. An engine system, comprising:
   an engine cylinder having a first exhaust valve, a second exhaust valve, and a third valve;
   a turbocharger;
   a first exhaust passage communicating the first exhaust valve directly to only a turbine of the turbocharger;
   a second exhaust passage communicating the second exhaust valve directly to only an emission control device;
   a third passage communicating the third valve directly to only an inlet of the turbocharger compressor.

19. The system of claim 18 further comprising a control system with computer readable instructions for:
   adjusting valve timings such that the third valve is activated to open towards an end of an exhaust stroke and close after an intake stroke has commenced and an intake valve is timed with positive valve overlap with the third valve.

20. The system of claim 19 wherein the third valve is activated during an engine cycle only when manifold pressure is higher than compressor inlet pressure and is deactivated and maintained closed under throttled conditions.

* * * * *